Jan. 23, 1934.      D. L. MATHIAS      1,944,753
WELDING ELECTRODE
Filed May 16, 1931

WITNESSES:
Arthur J. McMahon
Robert E. Sadtler

INVENTOR
David L. Mathias
BY Wesley G. Carr
ATTORNEY

Patented Jan. 23, 1934

1,944,753

UNITED STATES PATENT OFFICE 1,944,753

WELDING ELECTRODE

David L. Mathias, Pittsburgh, Pa., assignor to Westinghouse Electric & Manufacturing Company, a corporation of Pennsylvania Application May 16, 1931. Serial No. 537,796

9 Claims. (Cl. 219—8)

My invention relates to welding electrodes and more particularly to electrodes having flux coatings.

The principal object of my invention is to provide a flux-coated welding electrode in which the flux shall be evenly distributed and securely anchored to the electrode by a conductor, thereby enabling it to be employed either in manual or in automatic arc-welding operations.

Another object of my invention is to provide a flux-coated welding electrode comprising a core, a helical member and a flux-coating, the helical member being adapted to introduce the welding current, through the flux coating, into the core.

A further object of my invention is to provide a flux-coated welding electrode in which the core shall have longitudinal grooves to receive a wire or wires, the composition of which is different from that of the core, so that alloying ingredients may be introduced into the weld during the welding operation.

A still further object of my invention is to provide a welding electrode having a concentric flux-coating of uniform depth and composition.

In producing flux-coated electrodes of certain types, it has heretofore been the practice to wind a second-class conductor, such as asbestos yarn, either alone or impregnated with a binder, in open helices around the electrode. The flux was then uniformly applied by any suitable method, such as extrusion, and anchored in place by the helical winding. However, before such a flux-coated electrode could be utilized in an electric-arc-welding operation, it was necessary to remove a part of the coating or casing from the electrode in order to provide a clean metallic contact between the electrode and the electrode holder. Difficulty was also encountered in introducing alloying ingredients, which are not readily pulverized, into the weld when the flux was applied to the electrode in the manner specified.

I have made the discovery that an electrode may be produced which may be satisfactorily employed for either manual or automatic welding by helically winding a first-class conductor, such as wire, around a rod or electrode, and that a concentric, uniform coating of flux may be applied to such electrode by an extrusion operation.

The flux coating may be securely attached to the electrode by means of a first-class conductor, a second-class conductor, or the combination of a first class and a second class conductor helically wound around the electrode. I prefer, however, to provide the electrode with transverse or longitudinal grooves so that, when the flux is extruded upon the electrode, it will be embedded in the grooves and between the turns of the helical conductor in such manner that the electrode may be bent or flexed without the flux composition flaking or peeling from the electrode.

My invention will be better understood by reference to the accompanying drawing, in which.

Figure 1:
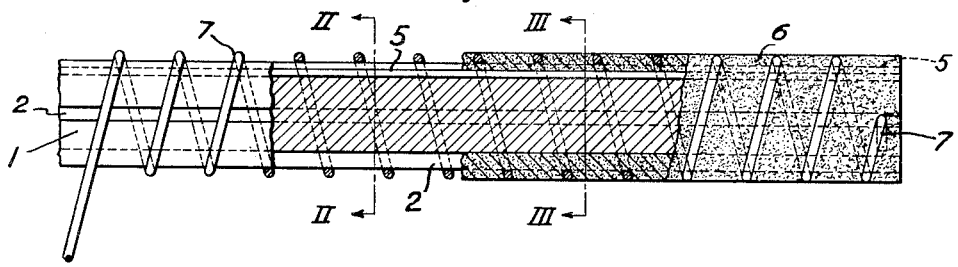
Figure 1 is a side-elevational view of my improved flux-coated electrode, the flux-coating being partly in cross section and partly broken away to show the longitudinal grooves and the arrangement of the helical member.
Figure 2:
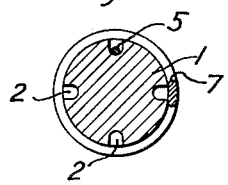
Fig. 2 is a cross-sectional view, taken on line II—II of Fig. 1.
Figure 3:
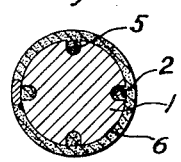
Fig. 3 is a similar view, taken on line III—III of Fig. 1.
Figure 4:
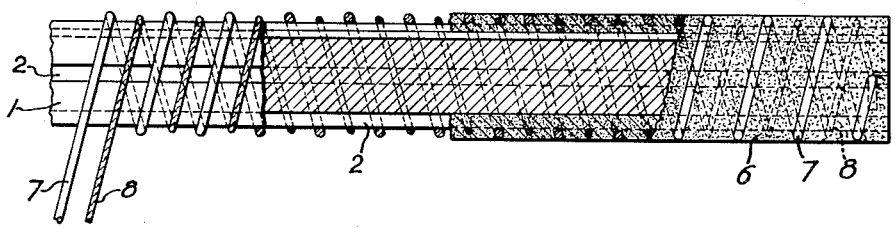
Fig. 4 is a view, similar to Fig. 1, showing a modified form of my improved coated electrode.
Figure 5:
Fig. 5 is an elevational view of a modification of the core of my electrode.
Figure 6:
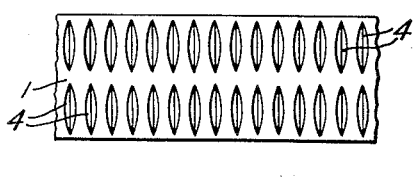
Fig. 6 is a similar view showing another modification of the core.
Figure 7:
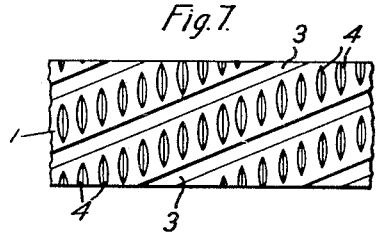
Fig. 7 is a similar view of another modification, showing a core provided with both grooves and notches.

As illustrated in the drawing, a core 1, of ferrous-base material, having a carbon content of from .01% to .35%, by weight, may be provided with longitudinal grooves 2, as shown in Figs. 1 and 4, helical grooves 3, as shown in Fig. 5, transverse notches 4, as shown in Fig. 6, or with a combination of notches and grooves as shown in Fig. 7. The grooves or notches may be formed by any suitable method, such as passing the electrode between grooving rolls or dies to displace the metal. When longitudinal grooves are employed, about four to six are usually sufficient to firmly anchor the flux in the electrode.

An alloying wire 5, composed of an alloy or a metal different from that of the core, may be placed in one or more of the longitudinal grooves for the purpose of altering the composition of the weld. The grooves 2 may also contain, in whole, or in part, a flux 6 of the same or of a different composition from the flux which is extruded between the turns of the helix. The wire 5 or the flux 6 may be composed of various elements or alloys, such as nickel, chromium, manganese, vanadium, or the ferrous alloys of such elements or mixtures thereof.

In order to form the completed electrode, a first-class conductor 7, as shown in Fig. 1, or both a first-class conductor, such as a wire, and a second-class conductor 8, such as cotton or asbestos yarn, as shown in Fig. 4, is wound as an open helix around the core, and the flux is extruded upon the electrode and anchored thereto by means of the helix and the grooves or notches. I do not desire to be limited, however, to the use of first-class conductors because, when the electrode is provided with grooves or notches, or a combination of grooves and notches, good results have been obtained, especially for manual welding, when the electrode is wound with a second-class conductor alone, such as asbestos or cotton yarn, or mixtures thereof.

When a first-class conductor, such as wire, is utilized, it may be held in position on the core by means of the grooves or transverse notches 4, as shown in Fig. 6, or the conductor may be permanently attached to the core by means of resistance welding, or it may be held in position by the natural tension exerted by the wire. The ends of the helical wire may be secured to the core by any well-known method, such as by notching the ends of the core and inserting the wire ends therein. In case the helical wire is retained in position by tension, I prefer to employ a soft drawn helical wire.

The turns of helically wound material are so spaced that excessive die pressure will not be exerted on the flux by the feeding mechanism when the electrode is passed through the processing machine during a subsequent operation. The number of turns of material may vary from 2 to 20 per inch, but I prefer to provide 8 to 10 turns per inch for electrodes having a relatively heavy flux coating. For example, when a core having a diameter of .156 of an inch was helically wound with wire having a thickness of .030 to .040 of an inch spaced to provide 8 turns of wire per inch of electrode surface, it enabled the flux to be uniformly distributed on the electrode and provided sufficient anchorage to maintain it permanently in place.

The helically wrapped core may be coated with a flux of any desired composition, by a dipping or extrusion operation. According to the latter method, the helically wound core is passed through a suitable die, and a flux composition of pasty consistency is applied, under pressure, to the wire, thus filling the grooves and the spaces between the turns of the helical member. The flux-coated wire is then immediately passed through an extruding or cleaning die to remove excess flux. Thus treated, the electrode may be dried in air or baked to harden the flux, which tends to shrink as it dries, thus causing the outer surface of the helix to project slightly above the flux, thereby providing a clean outer surface on the helical member for contact with the electrode holder. The electrode produced by this method may be cut into suitable lengths for utilization in manual welding operations or it may be employed in an automatic welding machine without further treatment.

The following specific examples will serve to illustrate and explain my invention. Three rods of ferrous-based material of low-carbon content, having a diameter of about .156 of an inch, were longitudinally grooved in the manner previously specified. One rod was helically wound with a wire having a diameter of .030 to .040 of an inch, the wire being of the same composition as the rod. The rod was then passed through an extruding machine and flux-coated with a composition comprising about 50 parts of kaolin, about 20 parts of calcium carbonate, about 10 parts of a ferro-manganese alloy, and about 20 parts of sodium resinate, sufficient sodium silicate solution being added to produce a plastic mass of paste-like consistency. The coated rod was then allowed to dry slowly in air until the flux had hardened. When employed in an electric-arc-welding operation, at a current of from 160 to 170 amperes, this electrode had a melting rate of from 26.5 grams to 27.2 grams per minute.

A second rod was grooved by the previously described method, and helically wrapped with cotton yarn, after which it was coated with a flux of the above-stated composition, and dried. When it was utilized as an electrode in an electric-arc-welding operation, at a current of 135 amperes, it had a melting rate of approximately 22.9 grams per minute.

A third rod was prepared and grooved in the above-described manner, and helically wrapped with asbestos yarn, and coated with a flux of the composition employed on the other rods, and dried. When utilized as an electrode in an electric-arc-welding operation, at a current of 135 amperes, it had a melting rate of 24.4 grams per minute.

The melting rates of each of the three electrodes described above were approximately 50% faster than unfluxed electrodes of similar diameter and composition, when tested under similar current values.

My improved flux-coated electrode may be satisfactorily utilized in either manual or automatic welding operations because the open helical winding, being in intimate contact with the core and also projecting slightly above the flux coating, permits the introduction of the welding current to the electrode at any position on its surface. Furthermore, by utilizing my improved electrode, alloying ingredients may be readily introduced into the weld because the longitudinal grooves in the core may contain a flux, a wire or wires, composed of metals or alloys of a different composition from that of the core, or the grooves and spaces between the helical turns may be filled with the alloy in combination with the flux in powdered form, or the helical wire itself may be formed of a metal or alloy which is different from the core metal.

While I have disclosed my invention in considerable detail and have given specific examples, it will be understood that these examples are to be construed as illustrative and not by way of limitation. For example, while I have disclosed a particular flux which may be utilized as a coating, I do not desire to be limited in this respect, as any desired flux may be employed. I prefer, however, to utilize a flux of the composition disclosed in my copending application, Serial No. 537,795 filed on May 16, 1931.

Other modifications of my invention will become apparent to those skilled in the art without departing from the spirit and scope of my invention. It is, therefore, desired that only such limitations shall be imposed as are indicated in the appended claims.

I claim as my invention:

1. A welding electrode comprising a metallic core and a surface coating of flux material, said flux material being anchored to said core by means of a combination of first and second-class conductors helically wound thereon.

2. A welding electrode comprising a grooved metallic core, a wire in said groove, the composition of which is different from that of the core, a flux evenly distributed over the surface and means for anchoring the flux to the core.

3. A welding electrode comprising a metallic core having a plurality of grooves therein, a wire, the composition of which is different from that of the core, located in one or more of the grooves and a flux coating on said electrode, a portion of the flux coating extending into the grooves and being anchored therein.

4. A welding electrode comprising a core provided with a plurality of substantially equally spaced longitudinally extending grooves in the periphery thereof, a first and a second class conductor spirally wrapped around the core, and a flux coating disposed on the core and extending into the grooves.

5. A welding electrode comprising a core provided with a plurality of substantially equally spaced longitudinally extending grooves in the periphery thereof, a first and a second class conductor spirally wrapped around the core, the first class conductor being in electrical engagement with the core, and a flux coating disposed on the core and extending into the grooves but not covering the external periphery of the spirally wrapped first class conductor.

6. A welding electrode comprising a core provided with a plurality of substantially equally spaced longitudinally extending grooves in the periphery thereof, the ridges between the grooves being provided with notches, a first and a second class conductor spirally wrapped around the core, the first class conductor being in electrical engagement with the core, and a flux coating disposed on the core and extending into the grooves and notches but not covering the external periphery of the spirally wrapped first class conductor.

7. A welding electrode provided with a plurality of substantially equally spaced longitudinally extending grooves in the periphery thereof, a conductor located in one or more of the grooves, a conductor spirally wrapped around the core, and a flux coating disposed on the core and extending into the grooves.

8. A welding electrode comprising a core provided with a plurality of substantially equally spaced longitudinally extending grooves in the periphery thereof, the ridges between the grooves being provided with notches, a wire located in one or more of the grooves, a first class conductor spirally wrapped around the core and in electrical engagement therewith, and a flux coating disposed on the core and extending into the grooves and notches but not covering the external periphery of the spirally wrapped first class conductor.

9. A welding electrode comprising a core provided with a plurality of substantially equally spaced longitudinally extending grooves in the periphery thereof, the ridges between the grooves being provided with notches, a wire located in one or more of the grooves, a first and a second class conductor spirally wrapped around the core, the first class conductor being in electrical engagement with the core, and a flux coating disposed on the core and extending into the grooves and notches but not covering the external periphery of the spirally wrapped first class conductor.

DAVID L. MATHIAS.